(12) United States Patent
Soni et al.

(10) Patent No.: US 9,330,513 B2
(45) Date of Patent: May 3, 2016

(54) RESOURCE MANAGEMENT BASED ON BIOMETRIC DATA

(71) Applicant: Microsoft Technology Licensing, LLC, Redmond, WA (US)

(72) Inventors: Himanshu Soni, Surrey (CA); Karanbir Singh, Seattle, WA (US); Arthur H. Baker, Redmond, WA (US); Vijay G. Bharadwaj, Sammamish, WA (US); Nelly L. Porter, Kirkland, WA (US); Violet Anna Barhudarian, Redmond, WA (US); John D. T. Wood, Redmond, WA (US); Jeffrey E. Shipman, Redmond, WA (US); Jeremy D. Viegas, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/018,680

(22) Filed: Sep. 5, 2013

(65) Prior Publication Data
US 2014/0354401 A1 Dec. 4, 2014

Related U.S. Application Data

(60) Provisional application No. 61/829,875, filed on May 31, 2013.

(51) Int. Cl.
| G06K 9/00 | (2006.01) |
| G07C 9/00 | (2006.01) |
| G06F 21/32 | (2013.01) |

(52) U.S. Cl.
CPC ............ *G07C 9/00158* (2013.01); *G06F 21/32* (2013.01)

(58) Field of Classification Search
None
See application file for complete search history.

(56) References Cited

U.S. PATENT DOCUMENTS 6,181,803 B1 * 1/2001 Davis ............................ 382/115
6,487,662 B1 * 11/2002 Kharon et al. ................ 713/186

(Continued)

FOREIGN PATENT DOCUMENTS

WO      WO0205077 A2      1/2002

OTHER PUBLICATIONS

Damousis, et al. "Unobtrusive multimodal Biometric Authentication: The HUMABIO Project Concept", pp. 1-11, Hindawi Publication Corporation, 2008.*

(Continued)

*Primary Examiner* — Daniel Mariam
(74) *Attorney, Agent, or Firm* — Timothy Chuma; Judy Yee; Micky Minhas

(57) ABSTRACT

The techniques and systems disclosed herein pertain to preventing unauthorized access to computing resources by unauthorized persons by deploying biometric security. To implement biometric security, the computing device, possibly by the OS, may obtain samples of one or more biometric factors unique to the owner. The computing device may construct pattern-matching templates corresponding to the biometric samples, which may be stored for later use when a protected resource is requested. Computing resources may be selected for protection by a biometric security mechanism by an authorized user or by other techniques or default settings. Before allowing certain restricted actions, the OS may request that the user provide one of the previously registered biometric samples. If the biometric sample matches the user's stored pattern-matching template, the OS may grant access to the computing resource, otherwise, the OS may deny access to the computing resource.

20 Claims, 8 Drawing Sheets

(56) References Cited

U.S. PATENT DOCUMENTS

| | | | |
|---|---|---|---|
| 6,910,132 B1* | 6/2005 | Bhattacharya | 713/186 |
| 6,950,539 B2* | 9/2005 | Bjorn et al. | 382/124 |
| 7,269,737 B2 | 9/2007 | Robinson | |
| 7,515,738 B1* | 4/2009 | Moritz | 382/115 |
| 7,689,832 B2 | 3/2010 | Talmor et al. | |
| 7,948,361 B2 | 5/2011 | Bennett et al. | |
| 8,014,570 B2* | 9/2011 | Le Saint et al. | 382/115 |
| 8,150,108 B2 | 4/2012 | Miller | |
| 8,159,328 B2* | 4/2012 | Luckhardt | 340/5.82 |
| 8,325,994 B2 | 12/2012 | Davida | |
| 8,368,510 B2 | 2/2013 | Luckhardt | |
| 8,694,792 B2* | 4/2014 | Whillock | 713/186 |
| 8,788,838 B1* | 7/2014 | Fadell et al. | 713/186 |
| 8,823,489 B2* | 9/2014 | Liu | 340/5.82 |
| 2002/0091937 A1* | 7/2002 | Ortiz | 713/200 |
| 2003/0074567 A1* | 4/2003 | Charbonneau | 713/186 |
| 2005/0187883 A1 | 8/2005 | Bishop et al. | |
| 2010/0115610 A1* | 5/2010 | Tredoux et al. | 726/19 |
| 2010/0135542 A1* | 6/2010 | Keepper et al. | 382/124 |
| 2010/0237991 A1* | 9/2010 | Prabhu et al. | 340/5.83 |
| 2010/0322487 A1* | 12/2010 | Geosimonian | 382/115 |
| 2011/0221568 A1 | 9/2011 | Giobbi | |
| 2011/0310044 A1 | 12/2011 | Higuchi | |
| 2012/0253953 A1 | 10/2012 | Aziz et al. | |
| 2014/0240092 A1* | 8/2014 | Nielsen | G05B 1/00 340/5.81 |

OTHER PUBLICATIONS

PCT Search Report and Written Opinion mailed Mar. 3, 2014 for PCT application No. US2013/061092, 10 page.

Cavret, "Payments at Your Fingertips, Thanks to Biometrics and Contactless Technology," retrieved from <<http://www.atelier.net/en/trends/articles/payments-your-fingertips-thanks-biometrics-and-contactless-technology>> on May 8, 2013, published on Oct. 29, 2012, 2 pages.

"Windows Biometric Framework Overview," retrieved from <<ttp://technet.microsoft.com/en-us/library/hh831396.aspx>> on May 30, 2013, published on Feb. 29, 2012 and updated on Aug. 1, 2012, 8 pages.

* cited by examiner

RESOURCE MANAGEMENT BASED ON BIOMETRIC DATA

CROSS REFERENCE TO RELATED PATENT APPLICATION

This patent application claims the benefit and priority to Provisional U.S. Patent Application No. 61/829,875, titled, "Resource Management Based On Biometric Data", filed on May 31, 2013, the entire disclosure of which is incorporated by reference herein.

BACKGROUND

Some local and remote computing resources are protected with passwords and/or personal identification numbers (PINs), such as operating systems, online accounts, files, and password lockers. To be effective, passwords typically need to be complex. However, typing a complex password on many popular devices, such as touch devices, is cumbersome and often results in errors. Out of frustration, users may resort to using short, simple passwords that don't provide adequate security. PIN values tend to be short, and users often reuse the same PIN in multiple settings, making them vulnerable to brute force attacks or guessing. Both PINs and passwords are vulnerable to "shoulder surfing" attacks, where someone watches the user enter the PIN or password. The availability of smart phones with video recording capabilities has made this kind of attack even easier.

On some computing devices, the host operating system allows users to save passwords on the device itself, so that the passwords do not have to be manually reentered for subsequent authorization events. While this may make it more likely that a user will choose a strong password, it can lead to problems if the host operating system releases the password without any additional prompting. For example, if the user shares the computing device with family members or a visiting friend, those people might be able to access otherwise secure resources without the user's consent.

There are a number of situations where multiple people might have access to a single computing device. For example, devices may be casually shared among family members and/or friends. For example, a parent may let a child use the computing device to play a game. Devices may be lost or stolen and used by an unauthorized person. If the device is unlocked at the time it's shared, lost, or stolen, the person possessing the device may have unrestricted access to resources that the device owner may want to keep private. For example, application programs that manage sensitive data, such as banking or brokerage records and/or stored passwords for corporate email accounts, websites, or other online services may be available for use by unauthorized users.

SUMMARY

The techniques and systems disclosed herein pertain to preventing unauthorized access to computing resources by unauthorized persons by deploying biometric security measures.

To implement biometric security, the computing device, possibly by the operating system (OS), may obtain samples of one or more biometric factors unique to the owner. The computing device may construct pattern-matching templates corresponding to the biometric samples, which may be stored for later use when a protected resource is requested. Computing resources may be selected for protection by the biometric security mechanism by an authorized user or by other techniques or default settings. Before allowing certain restricted actions, the OS may request that the user provide a sample of one of the previously registered biometric factors. If the biometric sample matches the user's stored pattern-matching template, the OS may grant access to the computing resource, otherwise, the OS may deny access to the computing resource.

In some embodiments, different types of biometric factors may be associated with different resources. Thus, to access a computing resource, an associated biometric sample may have to be obtained from an authorized user. Some biometric samples may be obtained from a user using an unobtrusive process, and thus captured without distracting the user. In various embodiments, a first device may include a protected resource. A second device may access the protected resource when a user of the second device is an authorized user. The first device may exchange biometric data with the second device to verify the identity of the user prior to providing access by the user to the protected resource via the second device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
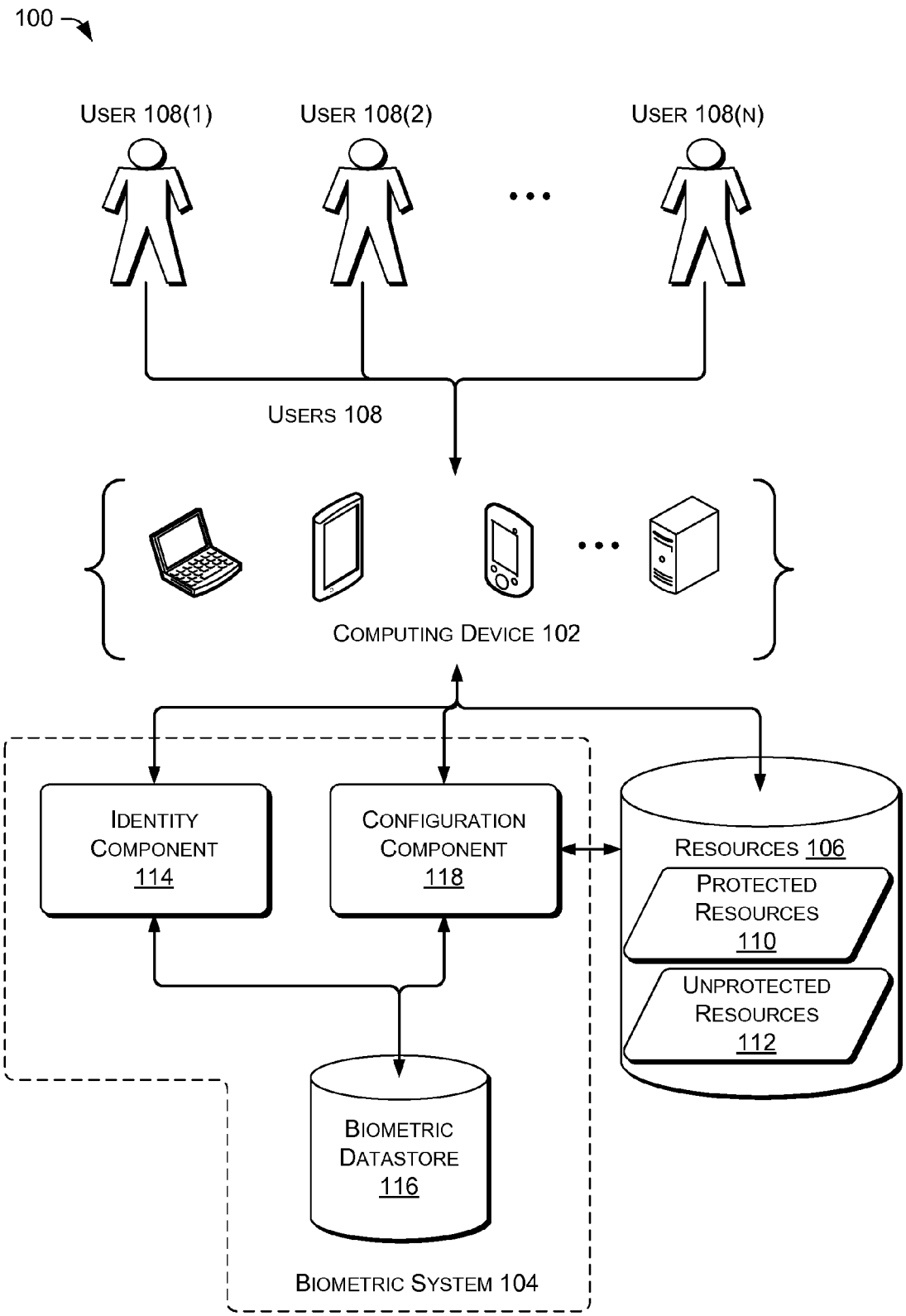
FIG. 1 is a schematic diagram of an illustrative environment that includes a computing device that provides resource management based on biometric data from users.

The techniques and systems disclosed herein pertain to preventing unauthorized access to computing resources by unauthorized persons by deploying biometric security. The computing resources may include applications, files, passwords, objects, and/or other computing resources which are accessible on a computer device that is running an operating system (OS). However, in some instances, some of these computing resources may be available to other devices via a network connection. In some embodiments, the computing resources may be protected by biometric security while made available to other devices via the network.

To implement the biometric security measures, the computing device may obtain samples of one or more biometric factors unique to the owner. These biometric factors might include some or all of the following: Fingerprints, palm-vein patterns, images of the owner's face, samples of the owner's voice, and other physical or behavioral characteristics. The computing device, possibly by the OS, may construct pattern-matching templates corresponding to the biometric samples, which may be stored for later use when a protected resource is requested. Computing resources may be selected for protection by the biometric security by an authorized user or by others, such as by using rules managed by the OS and/or rules managed by developers of applications or other computing resources. Before allowing certain restricted actions, the OS may request that the user provide a sample of one of the previously registered biometric factors. If the biometric sample matches the user's stored pattern-matching template, the OS may grant access to the computing resource, otherwise, the OS may deny access to the computing resource.

The computing device and/or the OS may implement biometric security using one or more techniques. Biometric security may be implemented using application cloaking, which involves the OS requiring the user to provide a biometric sample that matches a previously registered pattern-matching template before launching a particular application. Biometric security may be implemented using in-app authentication, where a developer is responsible for preventing unauthorized users from accessing application data. In in-app authentication, before accessing sensitive data or performing other restricted actions, the application asks the OS to verify the identity of the person running the application. In some embodiments, biometric security may be implemented to protect stored passwords and/or to eliminate the need for passwords. For example, the biometric samples may be used in place of traditional passwords rather than being used to retrieve passwords from otherwise secure or locked storage (e.g., a password locker, etc.)

In accordance with one or more embodiments, different types of biometric samples may be collected and/or utilized by the computing device and/or OS. The collection may be performed when configured by the user and with the consent of the user. Samples of some biometric factors may be collected by an unobtrusive process, which requires no volitional act, thought or prompting of action for the user at the time of collection, despite consent to these actions in an earlier configuration process. Examples of these types of biometric samples may include analysis of images of a user's face captured by a camera and analysis of touch patterns captured by a touch interface, among other possibilities. These types of biometric samples may be collected while a user interacts with the computing device, and may be collected without the user being explicitly aware at the time of collection of the sample. Other types of biometric samples (obtrusive types) may require a prompt to alert the user to take action to allow collection of the biometric sample. Examples of these types of biometric samples may include collection of a finger scan and voice/speech analysis, among other possibilities. In various embodiments, a combination of unobtrusive and obtrusive types of biometric sampling may be implemented to minimize user distraction while balancing security risks and/or other factors.

The processes and systems described herein may be implemented in a number of ways. Example implementations are provided below with reference to the following figures.

Illustrative Environment

FIG. 1 is a schematic diagram of an illustrative environment 100 that includes a computing device that provides resource management based on biometric samples obtained from users. The environment 100 may include a computing device 102 in communication with a biometric system 104. The biometric system 104 may be at least partially locally stored on the computing device 102, at least partially remotely stored on another device, or a combination thereof. The biometric system 104 may provide management of computing resources 106 (or simply "resources") which are accessible by the computing device 102. For example, at least some of the resources 106 may be protected from access by non-authorized users, and thus the biometric system 104 may require submission of one or more biometric samples from an authorized user to determine whether the user is authorized to access the resource (e.g., to verify the identity of the authorized user, etc.). The resource 106 may be, without limitation, an application, a file, a data object, a password, a password locker, an account, a database, system controls, and/or other types of computing resources. In some embodiments, the biometric system 104 may be controlled or implemented by an operating system (OS) of the computing device 102. The computing device 102 may be a mobile telephone (e.g., a smart phone, a digital assistant, etc.), a portable computer, a tablet computer, or any other electronic device having access to the resources 106.

Various users 108 may have access to the computing device 102. However, only some of the users 108, such as a user 108(1), may be authorized users that are authorized to access some of the resources 106, referred to as protected resources 110 that are protected by at least the biometric system 104 to prevent access by non-authorized users (e.g., a user 108(2), ..., a user 108(n), etc.). Meanwhile, some or all of the users 108 (e.g., the user 108(1), the user 108(2), ..., the user 108(n), etc.) may be able to access, via the computing device 102, other ones of the resources 106, referred to as unprotected resources 112 because these resources are not protected by the biometric system 104.

The biometric system 104 may include an identity component 114 to collect biometric samples and compare these samples with previously-registered pattern-matching templates. The biometric samples may be stored as the previously registered pattern-matching templates in a biometric datastore 116. The biometric system 104 may also include a configuration component 118 that is in communication with the resources 106. The configuration component 118 may associate one or more computer resources with one or more biometric samples through a mapping or other configuration, which may then require receipt of biometric sample(s) that match previously-registered pattern-matching template(s) prior to the user receiving access to the protected resources 110. The identity component 114, the configuration component 118, and the biometric datastore 116 are discussed in further detail with reference to FIG. 2.

Figure 2:
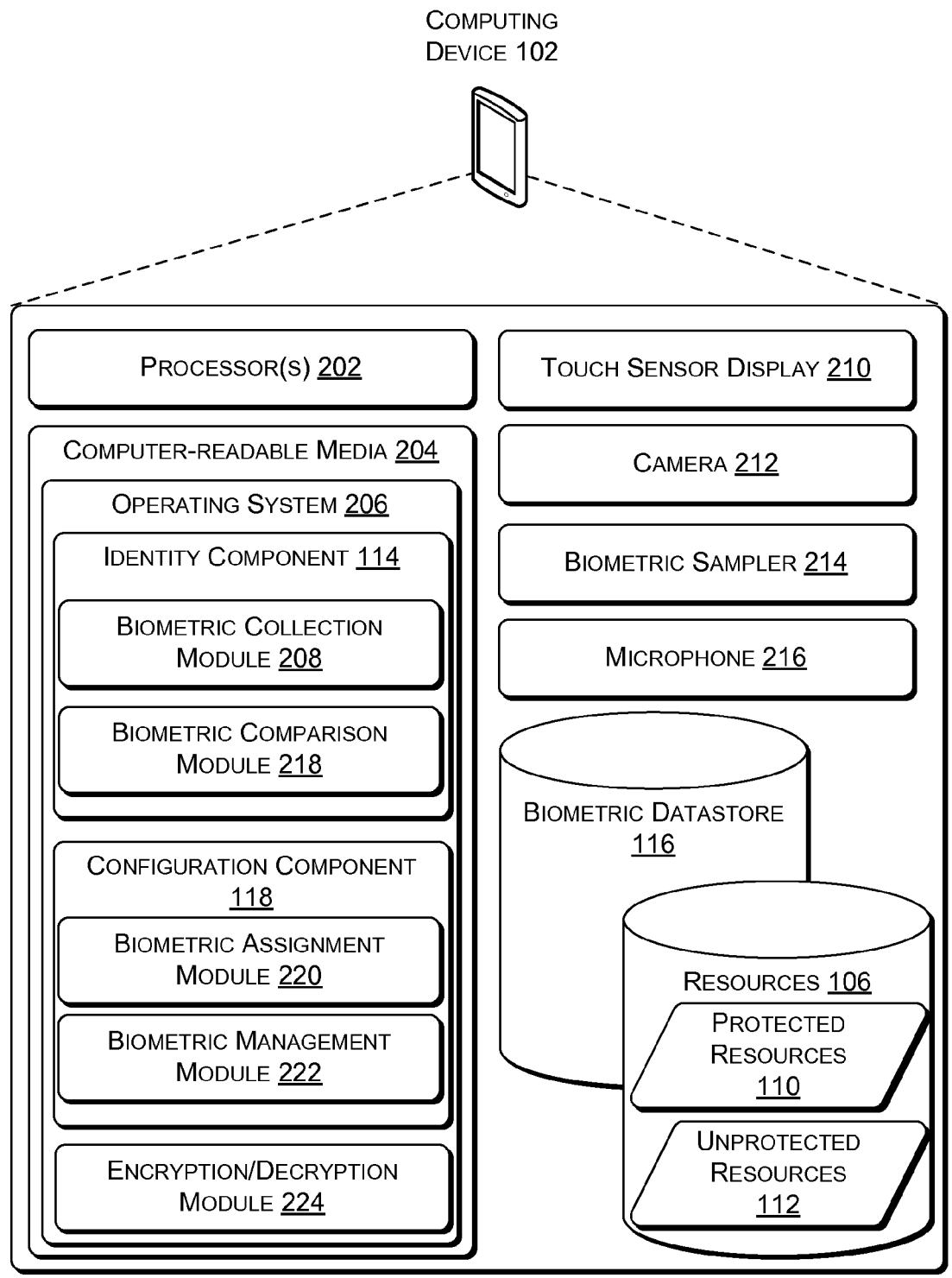
FIG. 2 is a block diagram of the illustrative computing device shown in FIG. 1.

FIG. 2 is a block diagram of the illustrative computing device 102 shown in FIG. 1. The computing device 102 may include processor(s) 202 and computer-readable media 204. The computer-readable media 204 may store various modules, applications, programs, or other data. The computer-readable media 204 may include instructions that, when executed by the processor(s) 202, cause the processor(s) to perform the operations described herein for the computing device 102. The computer-readable media 204 may store an operating system (OS) 206, the identity component 114, the configuration component 118, and/or other possible components, modules, and so forth. The OS 206 may be any software platform that manages use and access of computing resources, such as data files, applications, and/or other software and data. In some embodiments, at least some of the components, modules, etc. may be stored and accessible from remote servers. The components, modules, etc. of the biometric system 104 may be implemented in a distributed configuration (e.g., cloud computing services, etc.) or non-distributed configuration (e.g., local device, etc.). Thus, the computing device 102 may operate in conjunction with or may utilize remote servers.

The computing device 102 may have additional features and/or functionality. For example, the computing device 102 may also include additional data storage devices (removable and/or non-removable) such as, for example, magnetic disks, optical disks, or tape. Such additional storage may include removable storage and/or non-removable storage. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. System memory, removable storage and non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media may include computer-executable instructions that, when executed by the processor(s) 202, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The identity component 114 may collect biometric samples and compare these samples to previously-registered pattern-matching templates. The identity component 114 may include a biometric collection module 208 to collect biometric samples from users. The biometric collection module 208 may be initially used to capture samples, which are stored for later use during a verification process. The biometric collection module 208 may also be used to collect samples during the verification process. The biometric collection module 208 may collect biometric samples from available hardware, such as without limitation a touch sensor display 210, a camera 212, a biometric sampler 214 (e.g., a finger scanner, etc.), a microphone 216, and/or other types of hardware that capture biometric samples.

Biometric samples may be classified into at least three groups: hand-based biometrics, face/head biometrics, and other biometrics. Example hand-based biometrics may include but is not limited to the following. One type is fingerprints, which can also include biometrics related to features of the finger and/or fingernails. Another example hand-based biometric can be hand geometry, which can relate to size, shape, or other dimensions of the user's hand, including fingers, knuckles, wrists, etc. Additionally, a vein pattern or other vascular features can be another example, as can a palm print pattern or portion thereof biometrics and traditionally have a relatively high level of uniqueness. A grip configuration can be another example, such as the relative position of fingers when holding, touching, or interacting with the device. Another example can be a hand thermogram that can, for example, employ a heat-based signature. These biometric samples may be obtained by a touch sensor display 210, a biometric sampler (e.g., dedicated finger scanner, etc.), and/or other dedicated or available hardware.

Example face/head biometrics may include a facial thermogram that, like the hand thermogram, can relate to a heat signature, but in this case the heat signature is for the face of the user. Facial features, including but not limited to features associated with an earlobe, forehead, lips, etc. of the user, can also serve as example biometrics, as can retinal features and iris features (e.g., iris patterns, blink patterns, sclera vein patterns, etc.).

Other biometrics may include a voice pattern and physical movement measurements (e.g., gait, interaction with a device, etc.). For example, a keystroke dynamic may examine intervals, trajectories, rhythms, etc. as a user is interacting with a device. Other patterns of force and acceleration, along with intervals, trajectories, rhythms, etc. may also be measured. Another example can be an odor or pheromone or another bodily excretion such as sweat or saliva. In addition heart beat patterns (or rhythms, heart rate), as well as other vascular biometrics such as blood pressure can also represent example biometrics.

The identity component 114 may include a biometric comparison module 218. The biometric comparison module 218 may transform a biometric sample captured by the biometric collection module 208 into a registered pattern-matching template that is stored in the biometric datastore 116 or into a pattern template for comparison with registered pattern-matching templates that are stored in the biometric datastore 116. The biometric comparison module 218 may construct statistical pattern-matching templates which can consistently and reliably associate biometric samples from an authorized user with that specific authorized user while distinguishing biometric samples from other users as not being from the authorized user.

The configuration component 118 may include a biometric assignment module 220. The biometric assignment module 220 may associate one or more of the resources 106 with one or more biometric samples through a mapping, association, or other configuration. Once mapped or otherwise associated, access to the resource 106 may require receipt of biometric sample(s) that match previously registered pattern-matching template(s) prior to the user receiving access to the resources 106. The biometric assignment module 220 may allow an authorized user to determine at least some of the assignments of biometrics, if any, to respective computing resources. For example, the authorized user may interact with a user interface (e.g., the UI shown in FIG. 7) to assign biometric security to at least some computing resources. The protected resources 110 may also be mapped or associated with biometric security based on default instructions of the OS 206, designations by application developers (e.g., software instructions, tags, etc.), and/or other default associations or other user configurations, etc. The biometric assignment module 220 may also provide options for different types of biometric factors for association with respective computing resources. As discussed above, types of biometrics include face/head biometrics, finger/hand biometrics, etc. The biometric assignment module 220 may also remove association between the computing resource and biometric security, such as when the authorized user desires to share a protected resource with a friend or other person.

The configuration component 118 may include a biometric management module 222. The biometric management module 222 may control access to the protected resources 110 in response to matching biometric samples and/or prevent access to the protected resources 110 in response to non-matching biometric samples from a user. In some embodiments, the biometric management module 222 may employ an encryption/decryption module 224 to secure the protected resources 110 and/or provide access to the protected resources 110. The encryption/decryption module 224 may use private and public keys to encrypt/decrypt the protected resources 110. In accordance with various embodiments, the biometric datastore 116 may store unique identifiers (e.g., the registered pattern-matching template, etc.) that are associated with private and/or public keys. Thus, when a matching biometric sample is obtained, the corresponding identifier may be used to obtain keys necessary to decrypt a protected resource. Likewise, the computing resources may be encrypted using the reverse process, possibly under control of the biometric comparison module 218. Thus, the biometric comparison module 218 and/or the biometric management module 222 may interact with the encryption/decryption module 224.

In some embodiments, the biometric management module 222 may provide access to some computing resources by a remote device operated by an authorized user when the computing resources are associated with a biometric security. This functionality is discussed below with reference to FIG. 6.

As discussed above, biometric security may be implemented using application cloaking, in-app authentication, password protection, and/or as an alternative to typed or otherwise user-entered passwords or PINs. Application cloaking involves the OS 206 requiring the user to provide a biometric sample that matches a previously-registered pattern-matching template before launching a particular application. In-app authentication allows a developer to prevent unauthorized users from accessing application data and/or functions by having the developer determine when to request biometric samples. In in-app authentication, before accessing sensitive data, functions, or performing other restricted actions, the application asks the OS 106 to verify the identity of the person running the application. In some embodiments, biometric security may be implemented to protect stored passwords and/or to eliminate the need for passwords. The biometric samples may be used in place of traditional passwords rather than being used to retrieve passwords from otherwise secure or locked storage (e.g., a password locker, etc.). Here, the computing device 102 sends the user's identity and the request to a resource. The key feature here is that the biometric sample is mapped directly onto the user's identity, rather than acting as a proxy for a password or other credential. Thus, the configuration component 118 may implement biometric security using one, some, or all of these techniques.

Figure 3:
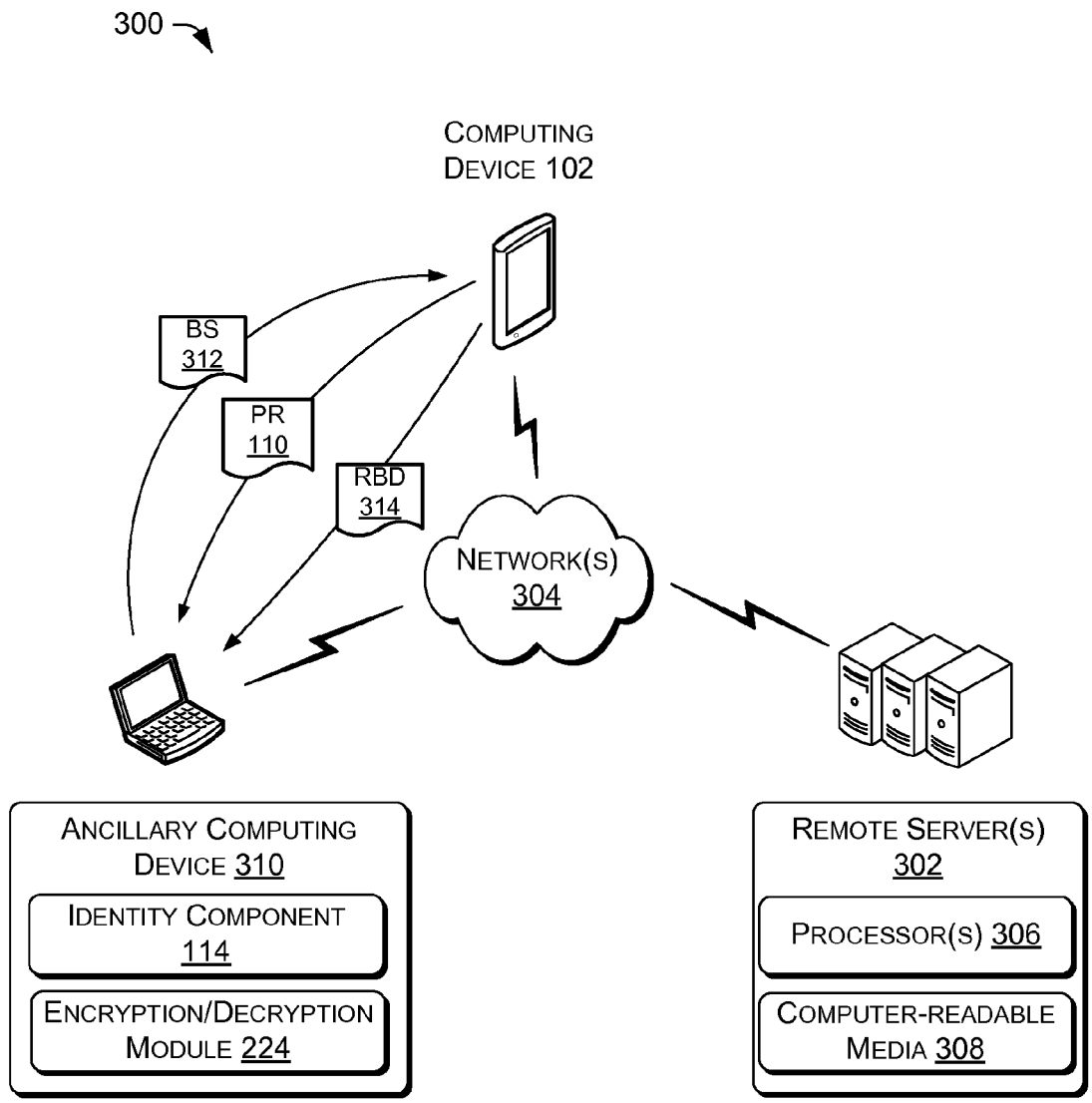
FIG. 3 is a schematic diagram of an illustrative network environment that provides communications between the computing device shown in FIG. 1 and remote servers and/or between the computing device and an ancillary computing device.

FIG. 3 is a schematic diagram of an illustrative network environment 300 that provides communications between the computing device 102 shown in FIG. 1 and one or more other devices.

As discussed above, the computing device 102 may operate in conjunction with or may utilize remote servers 302. For example, the computing device 102 may communicate with the remote servers 302 over one or more network(s) 304. The network(s) 304 may be any type of wired or wireless networks, including mobile telephone networks, the internet, and so forth.

The remote servers 302 may include a computing infrastructure of processors, storage, software, data access, and so forth that is maintained and accessible via the network(s) 304. The remote servers 302 may not require end-user knowledge of the physical location and configuration of the system that delivers the services. Common expressions associated for these remote servers 302 may include "on-demand computing," "software as a service (SaaS)," "platform computing," "network-accessible platform," "cloud services," "data centers," and so forth. The remote servers 302 may include processor(s) 306 and computer-readable media 308, which may store or otherwise have access to some or all of the components described with reference to the computer-readable media 204 of the computing device 102.

The networking environment 300 may include an ancillary computing device 310 which may be accessible by a user that is authorized to access some of the protected resources 110 that are stored on or accessed via the computing device 102. The ancillary computing device 310 may be in communication with the computing device 102 via the network(s) 304. The network(s) 304 may include a home network, a local area network (LAN), the internet, wireless networks, etc. The authorized user may use the ancillary computing device 310 to access the protected resource 110 from the computing device 102. However, since the computing resource being accessed is protected, additional processing may be performed to ensure that the user requesting the computing resource is an authorized user.

In some embodiments, the ancillary device 310 may request a biometric sample 312 from the user via the identity component 114. Identity data associated with the biometric sample 312 may be processed and transmitted to the computing device 102 prior to the computing device 102 transmitting or permitting access by the user to the protected resource 110.

In various embodiments, the computing device 102 may transmit roaming biometric data (RBD) 314 along with the protected resource 110, such as when the protected resource 110 is encrypted. The ancillary computing device 310 may obtain the biometric sample and process the biometric sample using the RBD 314. The RBD 314 may enable access to keys used by the encryption/decryption module 224 to decrypt the protected resource 110 when the biometric sample from the user matches the pattern-matching template that corresponds to the protected resource 110. The ancillary computing device 310 may include additional encryption/decryption used to access the RBD 314. For example, the ancillary computing device 310 may include the same operating system as the computing device, which facilitates secure exchange or sharing of the biometric data via the RBD 314.

Illustrative Operations

Figure 4:
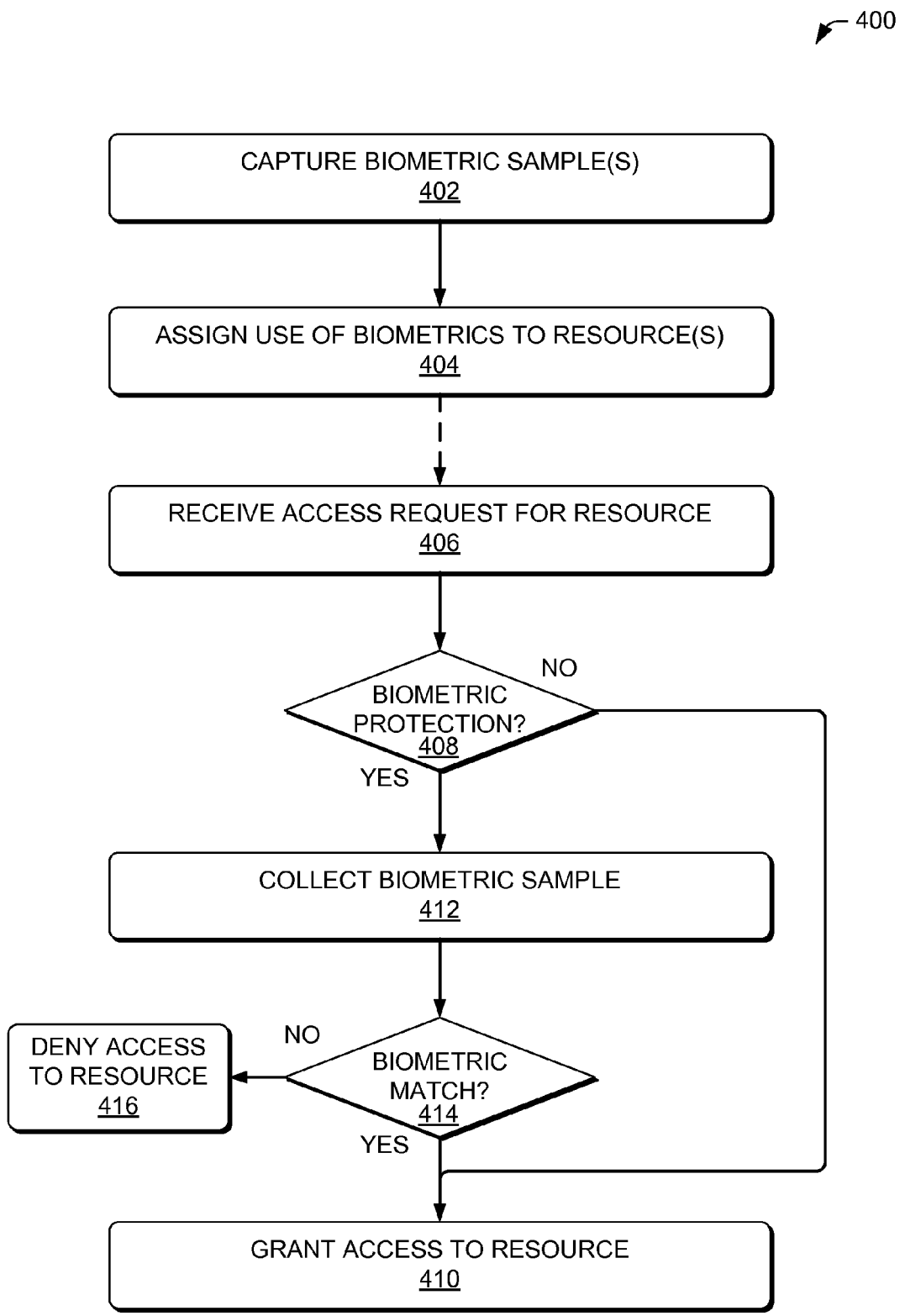
FIG. 4 is a flow diagram of an illustrative process of managing resources based on biometric data.
Figure 5:
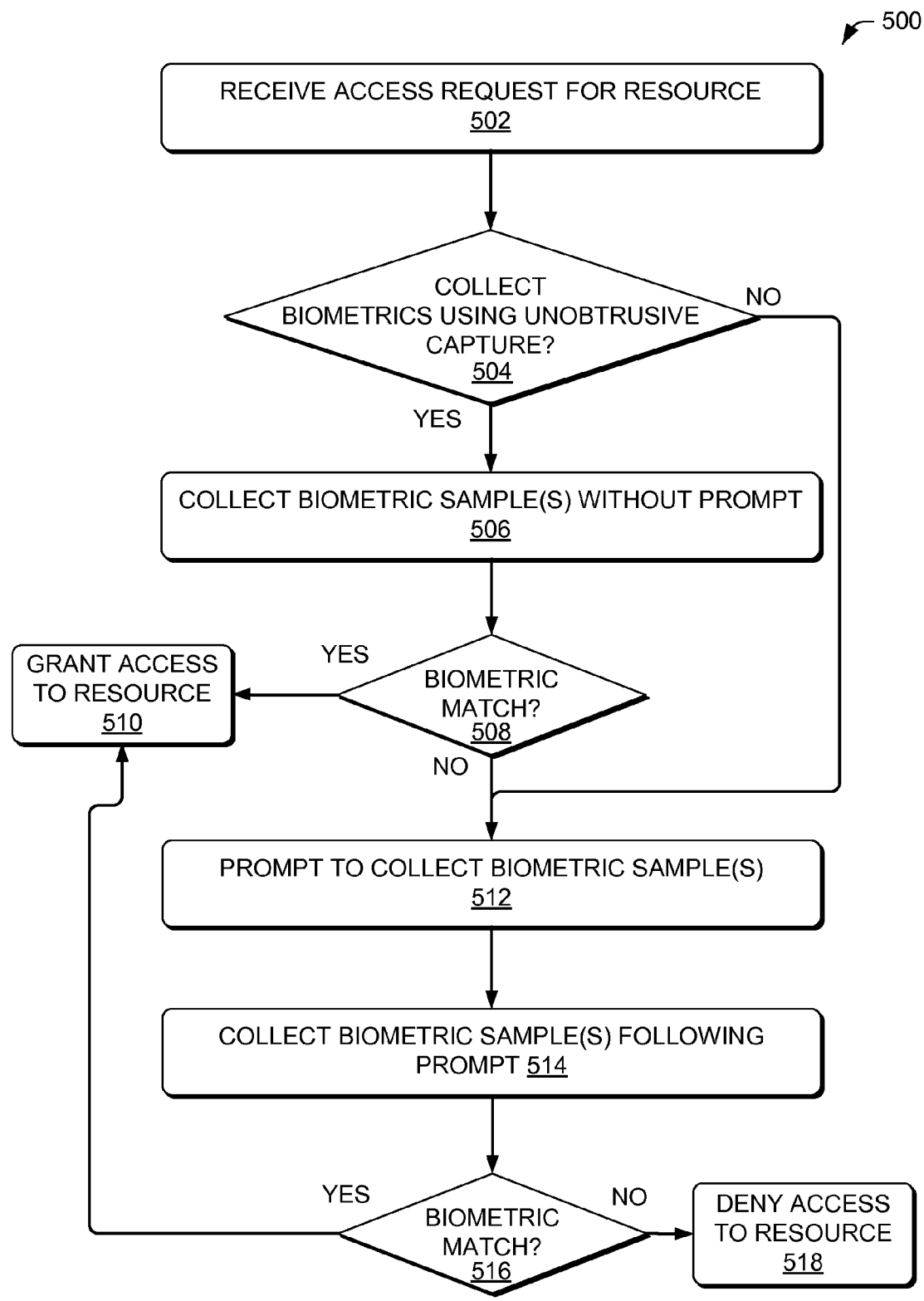
FIG. 5 is a flow diagram of another illustrative process of managing resources based on biometric data selectively collected, in some instances, using an unobtrusive collection of the biometric data.
Figure 6:
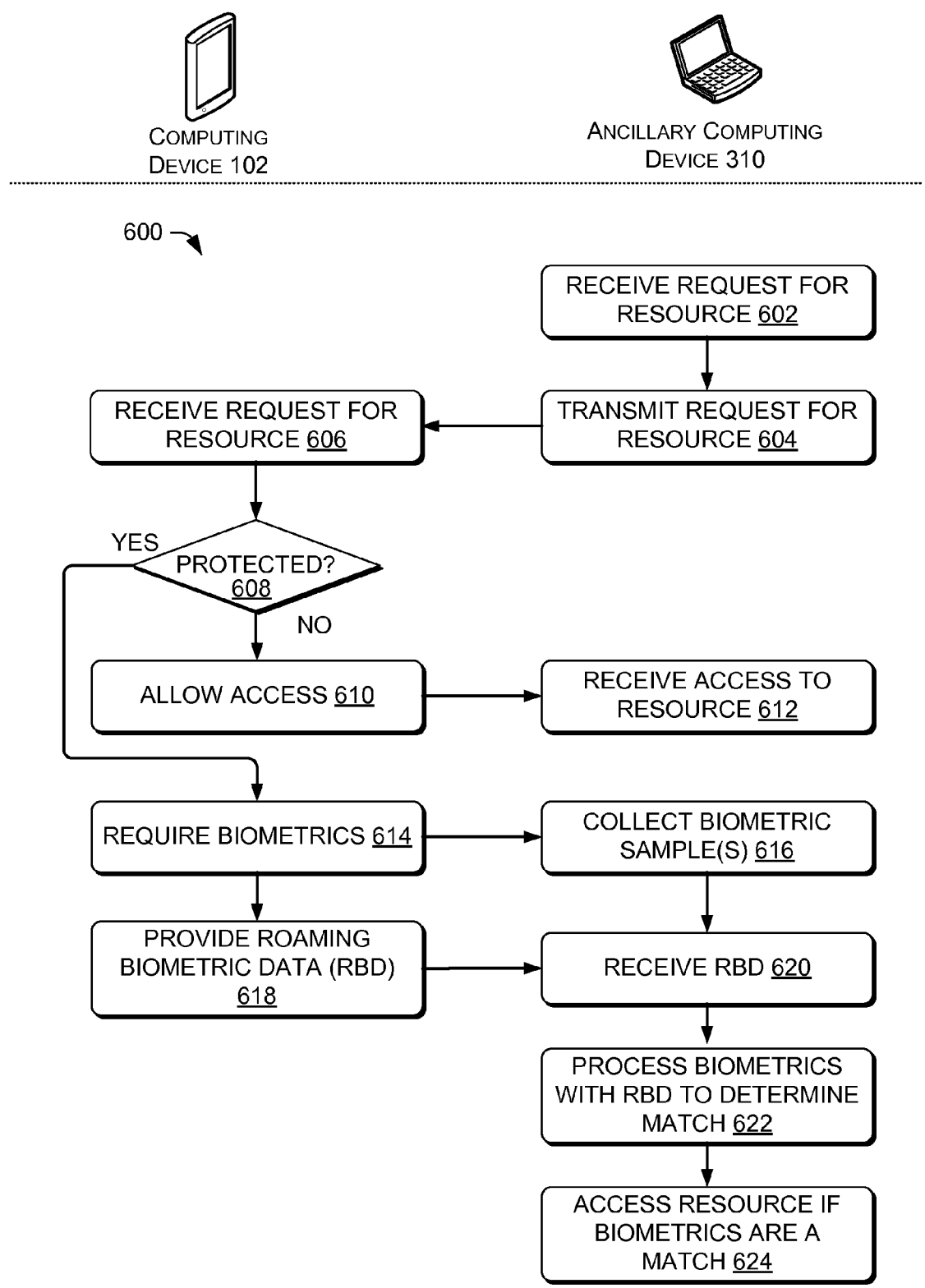
FIG. 6 is a flow diagram of an illustrative process of accessing a resource protected with biometric data from another computing device.

FIGS. 4-6 show various processes to facilitate resource management based on biometric data. The processes are illustrated as a collection of blocks in a logical flow graph, which represents a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 4 is a flow diagram of an illustrative process 400 of managing resources based on biometric data. The process 400 may be performed by the biometric security 104 that is executed at least in part by the computing device 102. The process 400 may be implemented using the environment 100 and/or the network environment 300. However, the process 400 may also be implemented in other environments.

The process 400 includes a configuration (setup) process that includes an operation 402 and an operation 404. At 402, the identity component 114 may capture one or more biometric samples from an authorized user. The biometric samples may be captured using various different types of hardware such as the touch sensor display 210, the camera 212, the biometric sampler 214, the microphone 216, and/or other hardware. At 404, the configuration component 118 may assign or associate at least some of the biometric samples (or pattern-matching templates from the biometric samples) to computing resources to transform the computing resources into the protected resources 110. The biometric samples and assignments may be stored in the biometric datastore 116. To access the protected resources in the future, the authorized user has to provide biometric samples that match the pattern-matching templates for the protected resources 110.

The process 400 includes an access process to enable access of the protected resources 110 or the unprotected resources 112 after the configuration process has been performed via the operations 402 and 404. The access process may begin at an operation 406. At 406, the operating system 206 may receive an access request for a computing resource from a user.

At 408, the configuration component 118 may determine whether the computing resource is a protected resource (e.g., the protected resource 110). When the computing resource is not protected (following the "no" route from the decision operation 408), then the process 400 may advance to an operation 410 to grant access to the computing resource. In this scenario, the computing resource is an unprotected resource (e.g., one of the unprotected resources 112).

However, when the computing resource is protected (following the "yes" route from the decision operation 408), then the process 400 may advance to an operation 412. At 412, the identity component 114 may collect one or more biometric samples from the user.

At 414, the identity component 114 may determine whether the collected biometric samples are a match with an authorized user. For example, the biometric comparison module 218 may determine whether the collected biometric samples match pattern-matching templates associated with the requested computing resource. When the samples are a match (following the "yes" route from the decision operation 414), then the process 400 may advance to the operation 410 to grant access to the computing resource requested at the operation 406. In this scenario, the computing resource is a protected resource (e.g., one of the protected resources 110). In some instances, the operation 410 may include decryption of the computing resource to enable the access by the user.

When the samples are not a match (following the "no" route from the decision operation 414), then the process 400 may advance to an operation 416 to deny access to the computing resource requested at the operation 406.

FIG. 5 is a flow diagram of another illustrative process 500 of managing resources based on biometric data selectively collected, in some instances, using an unobtrusive collection of the biometric data. The process 500 may be performed by the biometric security 104 that is executed at least in part by the computing device 102. The process 500 may be implemented using the environment 100 and/or the network environment 300. However, the process 500 may also be implemented in other environments.

At 502, the operating system 206 may receive an access request for a computing resource from a user.

At 504, the identity component 114 may determine whether to collect biometric sample(s) using an unobtrusive capture. An unobtrusive capture may be a process that does not disrupt the user or require any thought or volitional act by the user, such as by capturing an image of the user's face or receiving a touch input from the user that is already interacting with a touch device for other reasons (e.g., interacting with the touch sensor display 210, etc.).

When the decision operation 504 allows collection of biometric samples using the unobtrusive process (following the "yes" route from the decision operation 504), then the process 500 may advance to an operation 506 to collect the biometric sample(s) using the unobtrusive process. In some instances, the identity component 114 may collect the biometrics samples using an unobtrusive process that is continuous, random, periodic, etc., and thus, the identity component 114 may have a most recent biometric sample available for analysis. Therefore, the collection at the operation 506 may occur prior to the request at the operation 502 in some instances.

At 508, the identity component 114 may determine whether the collected biometric samples are a match with an authorized user. For example, the biometric comparison module 218 may determine whether the collected biometric samples match pattern-matching templates associated with the requested computing resource. When the samples are a match (following the "yes" route from the decision operation 508), then the process 500 may advance to the operation 510. At 510, the OS 206 may grant access to the computing resource requested at the operation 502, possibly by decrypting the computing resource using the encryption/decryption module 224 or by otherwise allowing access to the computing resource.

When the samples are not a match (following the "no" route from the decision operation 508), or when the decision operation 504 does not allow collection of biometric samples using the unobtrusive process (following the "no" route from the decision operation 504), then the process 500 may advance to the operation 512. At 512, the identity component 114 may prompt the user to allow the identity component 114 to collect the biometric sample(s). In some instances, the unobtrusive process outlined above may fail because the using does not provide correct samples or is otherwise unaware of what samples are to be collected (e.g., is not looking at a camera that takes a picture for use in facial recognition, etc.). Thus, the operation 512 may be used to prompt the user to perform actions to allow the identity component 114 to collect the biometric samples.

At 514, the identity component 114 may collect the biometric samples. The type of biometric samples collected at the operation 514 may be the same or different than the type of biometric samples collected at the operation 506.

At 516, the identity component 114 may determine whether the collected biometric samples are a match with an authorized user. For example, the biometric comparison module 218 may determine whether the collected biometric samples match pattern-matching templates associated with the requested computing resource. When the samples are a match (following the "yes" route from the decision operation 516), then the process 500 may advance to the operation 510. At 510, the OS 206 may grant access to the computing resource requested at the operation 502, possibly by decrypting the computing resource using the encryption/decryption module 224 or by otherwise allowing access to the computing resource. When the samples are not a match (following the "no" route from the decision operation 516), then at 518, the OS 206 may deny access to the computing resource requested at the operation 502. In some embodiments, the OS 206 may enable the user to provide an alternative proof of identity (e.g., a typed password, a PIN, etc.) in the event that the user cannot provide the matching biometric sample. For example, when the authorized user's hand/arm is in a cast.

FIG. 6 is a flow diagram of an illustrative process 600 of accessing a resource protected with biometric data from another computing device. The process 600 may be performed by the biometric system 104 that is executed at least in part by the computing device 102 and the ancillary computing device 310. The process 600 may be implemented using the environment 100 and/or the network environment 300. However, the process 600 may also be implemented in other environments. The operations in the process 600 are shown under respective devices that may perform the operations.

At 602, the ancillary computing device 310 may receive a request from a user to access a computing resource that is located (e.g., stored, executed from, etc.) the computing device 102.

At 604, the ancillary computing device 310 may transmit a request to the computing device 102 for the computing resource. The request may be received at 606 by the computing device 102.

At 608, the computing device 102 may determine whether the computing resource is a protected resource (e.g., the protected resource 110). When the computing resource in not a protected resource (following the "no" route from the decision operation 608), then the process 600 may advance to an operation 610. At 610 the computing device 102 may allow access to the computing resource, such as by transmitting the computing resource to the ancillary device 310. The ancillary device 310 may receive the computing resource at 612.

When the computing resource in a protected resource (following the "yes" route from the decision operation 608), then the process 600 may advance to an operation 614. At 614, the computing device 102 may require biometric samples to be collected by the ancillary computing device 310 from the user in order to allow access to the computing resource. At 616, the ancillary computing device 310 may collect biometric sample(s) from the user.

In accordance with some embodiments, at 618, the computing device 102 may provide roaming biometric data (RBD) (e.g., the RBD 314) to the ancillary computing device 310, which may be used to verify a match of the biometric samples obtained at the operation 616. At 620, the ancillary computing device 310 may receive the RBD. In some embodiments, the ancillary computing device 310 may decrypt the RBD prior to using the RBD to extract a pattern-matching template and/or other data from the RBD.

At 622, the ancillary computing device 310 may process the biometric sample(s) using the RBD to determine whether the biometric sample(s) match a pattern-matching template. At 624, the ancillary computing device 310 may access the computing resource in response to the biometric sample(s) matching of the pattern-matching template. In some embodiments, the operation 624 may include decrypting the remote computing device using information in the RBD.

In some embodiments, the processing of the biometric sample(s) may be performed by the computing device 102. For example, after the operation 616, the ancillary computing device 310 may transmit identity data associated with the biometric sample(s) to the computing device 102, which may compare the identity data to the pattern-matching template, and in response to a match, provide access to the remote computing device such as discussed in the operations 610 and 612. In this situation, the computing resource may or may not be encrypted.

Illustrative User Interface

Figure 7:
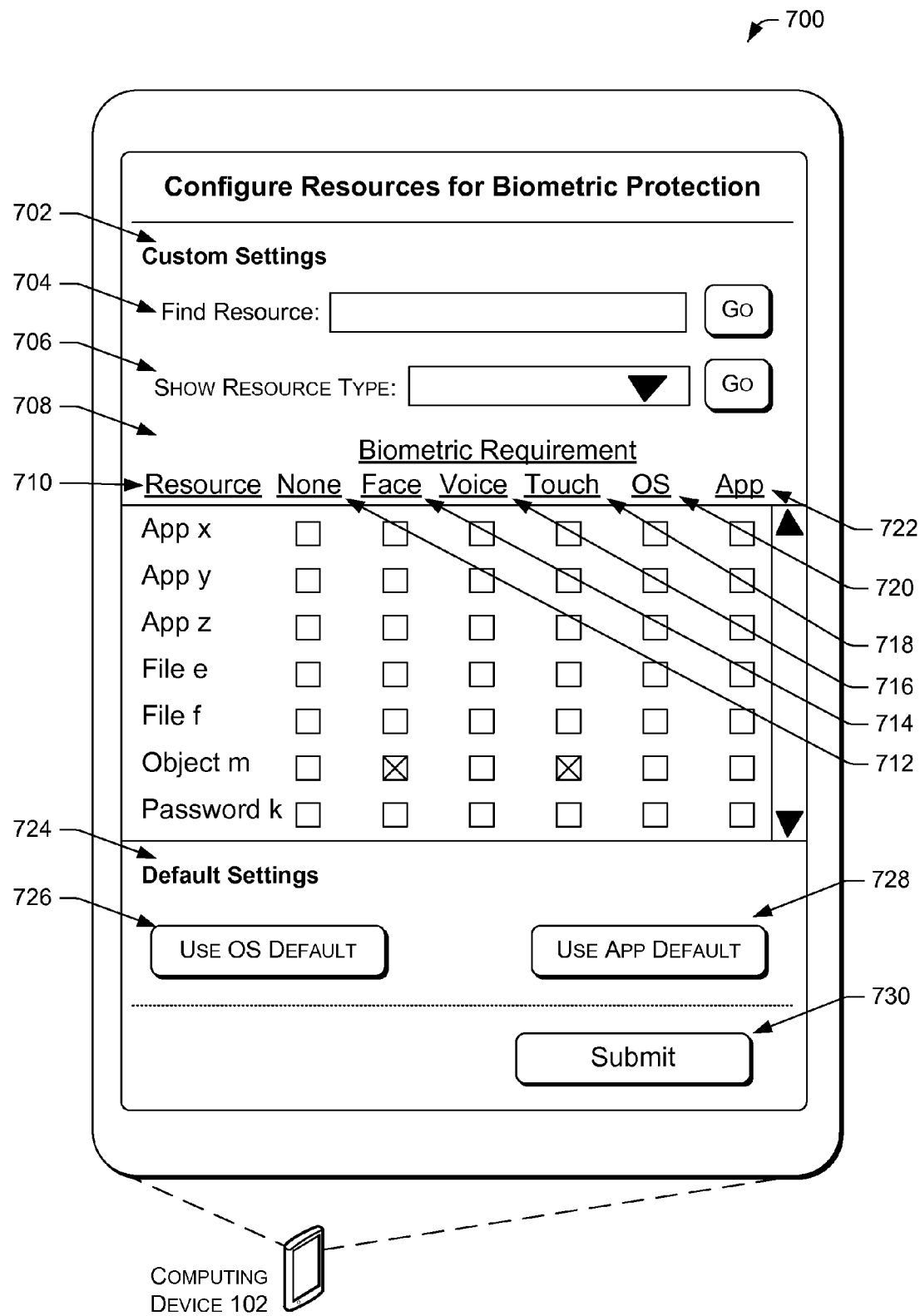
FIG. 7 is an illustrative user interface (UI) to configure biometric settings for available resources.

FIG. 7 is an illustrative user interface (UI) 700 to configure biometric settings for available resources. The UI 700 includes possible information that may be collected by the computing device 102 running the configuration component 118, which may associate computing resources with selected requirements for biometric sample(s).

The UI 700 may include a custom setting section 702 to enable an authorized user to location resources using a search control 704 and/or using a filter control 706, which may provide access to resources in a resource mapping section 708 (e.g., files, applications, objects, passwords, etc.). The resource mapping section 708 may show resources 710 and allow mapping "none" or to one or more types of biometric samples. The resource mapping section may include a none selector 712, a face selector 714, a voice selector 716, a touch selector 718, and/or other types of biometric samples, which when selected, require matching samples from the authorized user prior to access of the associated computing resource. For example, a computing resource, "object m", may include a selection of the face selector 714 and the touch selector 718. Thus, to access the computing resource, "object m", the user may have to provide both a face sample (e.g., for face recognition, retinal scanning, etc.), and a touch sample (e.g., a fingerprint scan, touch pattern via a touch sensor display, etc.). In some embodiments, the computing resource may be accessed by providing any one of the associated biometric samples. In these instances, using the example of the "object m" from above, the user may have to provide a face sample or a touch sample to access the computing resource, "object m".

An OS selector 720, when selected, may implement default settings used by the OS 206 for this computing resource. Likewise, an App selector 722, when selected, may implement default settings used by an application (e.g., as determined by a developer, etc.) for this computing resource. When the OS selector 720 and/or the App selector 722 is selected, then corresponding selectors may become selected depending on the default values associated with the OS selector 720 and/or the App selector 722.

The UI 700 may include a default settings section 724 that may enable a user to apply default OS settings using a default OS settings control 726. The default settings section 724 that may enable a user to apply default App settings using a default App settings control 728.

The user may implement selections from the UI 700 using a submit control 730.

Illustrative Computing Device

Figure 8:
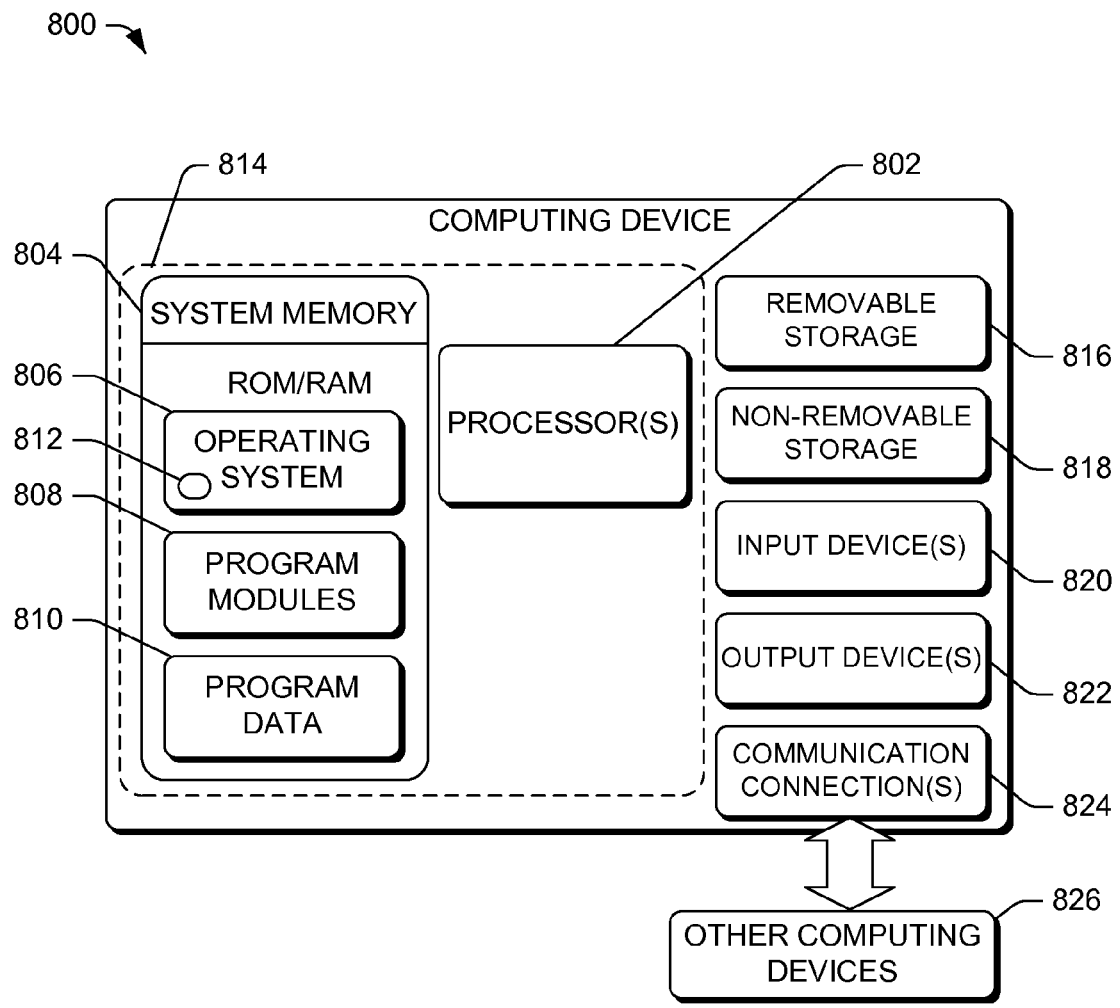
FIG. 8 is another schematic diagram of the illustrative computing device shown in FIG. 1.

FIG. 8 is a block diagram of an illustrative computing device 800 that may be used as the computing device 102 described above. It will readily be appreciated that the various embodiments of synonym identification techniques and mechanisms may be implemented in other computing devices, systems, and environments. The computing device 800 shown in FIG. 8 is only one example of a computing device and is not intended to suggest any limitation as to the scope of use or functionality of the computer and network architectures. The computing device 800 is not intended to be interpreted as having any dependency or requirement relating to any one or combination of components illustrated in the example computing device.

In a very basic configuration, the computing device 800 typically includes at least one processing unit 802 and system memory 804. Depending on the exact configuration and type of computing device, the system memory 804 may be volatile (such as RAM), non-volatile (such as ROM, flash memory, etc.) or some combination of the two. The system memory 804 typically includes an operating system 806, one or more program modules 808, and may include program data 810. The operating system 806 includes a component-based framework 812 that supports components (including properties and events), objects, inheritance, polymorphism, reflection, and provides an object-oriented component-based application programming interface (API). The computing device 800 is of a very basic configuration demarcated by a dashed line 814. Again, a terminal may have fewer components but will interact with a computing device that may have such a basic configuration.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 816 and non-removable storage 818. The computing device 800 may also have input device(s) 820 such as keyboard, mouse, pen, voice input device, touch input device, etc. Output device(s) 822 such as a display, speakers, printer, etc. may also be included. These devices are well known in the art and are not discussed at length here.

The computing device 800 may also contain communication connections 824 that allow the device to communicate with other computing devices 826, such as over a network. These networks may include wired networks as well as wireless networks. The communication connections 824 are one example of communication media. The communication media may typically be embodied by computer readable instructions, data structures, program modules, etc.

It is appreciated that the illustrated computing device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 800 may be implemented in a cloud computing environment, such that resources and/or services are made available via a computer network for selective use by client devices.

Conclusion

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A biometric security system comprising:
one or more biometric sensors arranged to capture biometric samples from a user;
one or more processors; and
memory coupled to the one or more processors, the memory including one or more modules that are executable by the one or more processors to:
cause a user interface to be displayed on a first computing device associated with an authorized user, the user interface configured to display a selectable list of biometric requirements to assign to individual ones of one or more computing resources;
receive, via the user interface, a selection of at least one biometric requirement from the selectable list of biometric requirements to assign to at least one computing resource of the one or more computing resources;
associate the at least one biometric requirement with the at least one computing resource based at least in part on the selection;
build a collection of stored templates for the user based on threshold biometric samples captured by the one or more biometric sensors from the user;
associate the at least one computing resource with at least one stored template of the collection of stored templates, the at least one stored template corresponding to the at least one biometric requirement; and
grant, a second computing device associated with the user, access to the at least one computing resource in response to receiving a biometric sample that matches the at least one stored template.

2. The biometric security system as recited in claim 1, wherein the at least one computing resource is an application that is restricted from launching until the biometric sample matches the at least one stored template of the collection of stored templates.

3. The biometric security system as recited in claim 1, wherein the at least one computing resource is a function of an application that is restricted from being performed until the biometric sample matches the at least one stored template of the collection of stored templates.

4. The biometric security system as recited in claim 1, wherein associating the at least one computing resource with the at least one stored template of the collection of stored templates is performed at least in part by a trusted server computing system.

5. The biometric security system as recited in claim 1, wherein associating the at least one computing resource with the at least one stored template of the collection of stored templates is performed at least in part by a developer of the at least one computing resource.

6. The biometric security system as recited in claim 1, wherein at least one stored template of the collection of stored templates for the user is associated with a heart beat pattern or blood pressure measurement.

7. The biometric security system as recited in claim 1, wherein at least one stored template of the collection of stored templates is associated with a keystroke dynamic.

8. The biometric security system as recited in claim 7, wherein the keystroke dynamic comprises interval patterns, trajectory patterns or rhythm patterns that are determined from user interaction with the second computing device.

9. The biometric security system as recited in claim 1, wherein:
the user and the authorized user are a same user; and
the first computing device and the second computing device are a same computing device.

10. A method comprising:
causing, a user interface to be displayed on a first computing device associated with an authorized user, the user interface configured to display a selectable list of biometric requirements to assign to individual ones of one or more computing resources;

receiving, from the first computing device, a selection of at least one biometric requirement from the selectable list of biometric requirements to assign to at least one computing resource of the one or more computing resources;

generating a pattern-matching template that corresponds to the at least one biometric requirement for a user of a second computing device based at least in part on the selection;

associating the pattern-matching template with the at least one computing resource based at least in part on the selection;

receiving a request to access the at least one computing resource;

collecting a biometric sample from the user of the second computing device using a biometric sensor;

comparing the biometric sample to the pattern-matching template associated with the at least one computing resource; and granting access to the at least one computing resource in response to the biometric sample matching the pattern-matching template.

11. The method as recited in claim 10, wherein the at least one computing resource is at least one of an application or a function performed by the application.

12. The method as recited in claim 10, wherein receiving the request is performed by an ancillary computing device that is different than the second computing device, and wherein the collecting the biometric sample includes receiving the biometric sample from the ancillary computing device; and further comprising transmitting the at least one computing resource to the ancillary computing device in response to the biometric sample matching the pattern-matching template.

13. The method as recited in claim 10, wherein granting access to the at least one computing protected resource further includes decrypting the at least one computing resource.

14. The method as recited in claim 10, further comprising:

denying access to the at least one computing resource in response to the biometric sample failing to match the pattern-matching template; and requesting an alternative proof of identity before granting access to the at least one computing resource.

15. The method as recited in claim 8, wherein to collect the biometric sample is performed by an ancillary computing device that is different than the second computing device.

16. One or more computer storage media storing computer-executable instructions that, when executed by one or more processors, causes the one or more processors to:

cause a user interface to be displayed on a first computing device associated with an authorized user, the user interface configured to display a selectable list of biometric requirements to assign to individual ones of one or more protected resources;

receive, from the first computing device, a selection of at least one biometric requirement from the selectable list of biometric requirements to assign to at least one protected resource of the one or more protected resources;

generate a pattern-matching template that corresponds to the at least one biometric requirement for a user of a second computing device based at least in part on the selection;

associate the pattern-matching template with the at least one protected resource based at least in part on the selection;

receive, from the second computing device, a request to launch an application or access a function performed by the application;

determine that the application or the function is associated with the at least one protected resource that requires a biometric sample that matches the pattern-matching template associated with the at least one biometric requirement;

collect the biometric sample from the user of the second computing device, the biometric sample being an unobtrusive biometric sample, wherein collecting the biometric sample occurs continuously or at predetermined time intervals without prompting the user;

compare the biometric sample to the pattern-matching template; and grant access to the at least one protected resource in response to the biometric sample matching the pattern-matching template.

17. The one or more computer storage media as recited in claim 16, wherein the granting access further includes decrypting the at least one protected resource.

18. The one or more computer storage media as recited in claim 16, wherein determining that the application or the function is associated with the at least one protected resource that requires the biometric sample is performed by an operating system that provides access to the application.

19. The one or more computer storage media as recited in claim 16, further comprising, denying access to the at least one protected resource in response to the biometric sample failing to match the pattern-matching template, wherein denying access further includes requesting an alternative proof of identity before granting access to the at least one protected resource.

20. The one or more computer storage media as recited in claim 16, wherein collecting the biometric sample from the user includes performing facial recognition of the user.

* * * * *